UNITED STATES PATENT OFFICE.

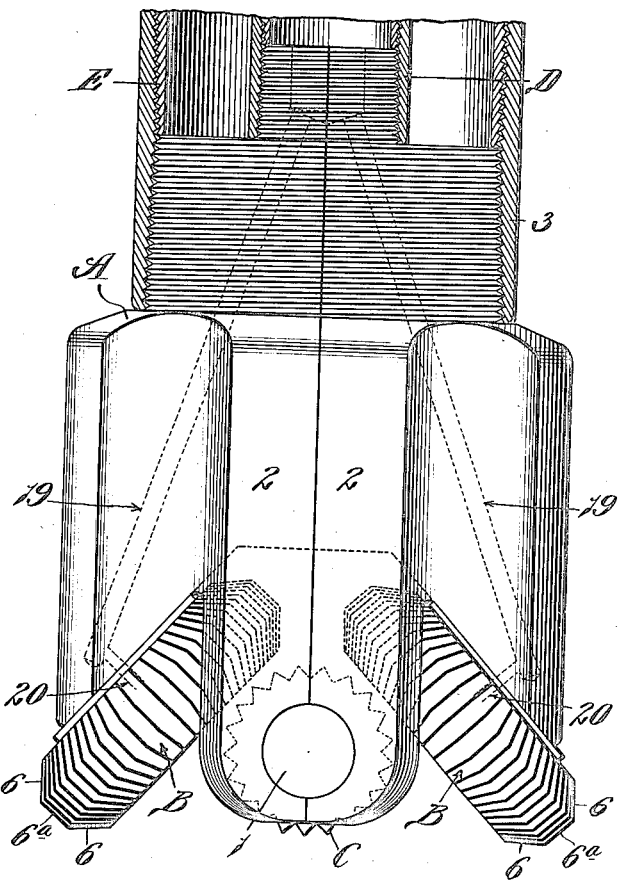
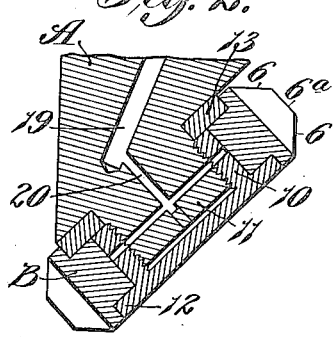
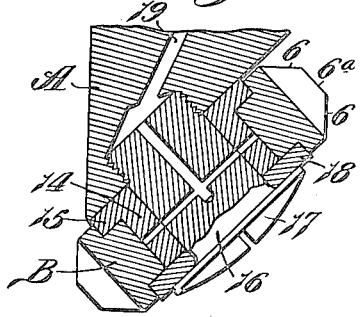

HOWARD R. HUGHES, OF HOUSTON, TEXAS, ASSIGNOR TO SHARP-HUGHES TOOL COMPANY, OF HOUSTON, TEXAS, A CORPORATION OF TEXAS.

ROTARY BORING-DRILL.

1,247,839.     Specification of Letters Patent.     Patented Nov. 27, 1917.

Original application filed February 24, 1914, Serial No. 820,675. Divided and this application filed November 19, 1914. Serial No. 873,048.

*To all whom it may concern:*

Be it known that I, HOWARD R. HUGHES, a citizen of the United States, residing at Houston, Texas, have invented a certain new and useful Improvement in Rotary Boring-Drills, of which the following is a full, clear, and exact description, such as will enable others skilled in the art to which it appertains to make and use the same.

This invention relates to rotary boring drills of the type in which the head of the drill is provided with inclined side cutters that have cutting surfaces which remove the material from the side wall of the hole so as to maintain the clearance for the head of the drill, my present application being a division of my co-pending application Serial #820,675, filed February 24, 1914, now issued as Patent No. 1,124,445, January 12, 1915.

The main object of my present invention is to provide a drill of the general type mentioned that is equipped with reversible side cutters of novel form that can be changed or arranged in a different position after the portions of same that act on the side wall of the hole have become worn, thus bringing into service the portions of the said cutters that are sufficiently sharp to remove the material from the side wall of the hole, and consequently, making it possible to use the drill for a long period without going to the trouble and expense of re-sharpening the cutters or renewing the cutters.

Another object is to provide a rotary boring drill that comprises means of novel construction for retaining the cutters in operative position on the head of the drill. Other objects and desirable features of my invention will be hereinafter pointed out.

Figure 1 of the drawings is a side elevational view of a drill constructed in accordance with my invention; and Figs. 2 and 3 are detail sectional views illustrating different ways of mounting the inclined side cutters on the head of the drill.

Referring to the drawings which illustrate one form of my invention, A designates two members that are clamped together to form the head of the drill and B designates a pair of inclined side cutters which revolve in planes that converge in the head of the drill and which are arranged on opposite sides of a horizontally-disposed cutting device C, shown partly in full lines and in broken lines in Fig. 1, that extends transversely across the head of the drill and which is rotatably mounted on a horizontally-disposed shaft 1. One of the inclined side cutters B is rotatably mounted on each section or part A of the head, and each of said parts or sections A is provided with a pair of integral arms or projections 2 which coöperate with similar portions on the other section of the head to form bearings for the opposite ends of the cross shaft 1, the two sections or parts A of the head being clamped together by means of a coupling sleeve 3 or secured together in any other suitable manner.

Each of the inclined side cutters B is provided with two oppositely inclined beveled cutting portions 6 of the same angle and the same cutting area that are arranged on opposite sides of a cylindrical cutting portion $6^a$, thereby forming a symmetrical cutter which can be reversed after the beveled portion 6 on one side of same that acts on the side of the hole and which is subjected to the greatest wear has become worn. The cutter has a cylindrical body of substantially disk shape and said cutting surfaces are formed by chisel teeth that extend transversely across the edge of said body substantially parallel to the axis of rotation of the cutter. This is a very desirable feature of a rotary boring drill, for it overcomes the necessity of re-sharpening the side cutters or substituting new side cutters after the cutting surfaces of said cutters which act on the side wall of the hole and maintain the clearance for the drill head have become worn to such a degree that the drill loses its clearance. It is true, of course, that the beveled portions of the side cutters B which act on the bottom of the hole are subjected to some wear, but these portions of the cutters are not subjected to as much wear as the beveled portions of said cutters that act on the side wall of the hole and which maintain the clearance for the drill head. Consequently, after the cutters have been reversed the portions of same which then act on the side wall of the hole are sufficiently sharp to remove the material from the side wall of the hole and thus maintain the clearance for the drill head. By providing the side cutters with cylindrical-shaped portions 6ª that are located intermediate the beveled portions of said cutters which act on the bottom and on the side wall of the hole I obtain cutters which have no sharp-pointed corner portions that will wear out quickly. In other words, if the beveled portions 6 of each cutter came together or merged into each other, the edge portion of the cutter would be pointed or inverted V-shaped, and after the cutter had been in use for a short period, this sharp-pointed edge portion would wear down and thus prevent the unworn portions of the cutter from cutting properly. Therefore, side cutters B of the design herein shown have two very desirable characteristics, namely, they are free from sharp-pointed edge portions which wear out quickly, and they can be reversed after the portions of same which are subjected to the greatest wear have become worn so as to bring into service the cutting portions of same which are still sufficiently sharp to maintain the clearance for the head.

The inclined side cutters B can be mounted on the head of the drill in various ways without departing from the spirit of my invention. In the construction illustrated in Fig. 2 the cutter is rotatably mounted on a cylindrical-shaped bushing 10 that is screwed onto an integral spindle 11 on the head, and an enlarged cap or end piece 12 is formed at the outer end of said bushing so as to lap over the cutter, the cutter preferably being provided in its outer face with a recess for receiving the enlarged cap or end piece 12 on the bushing. A similar recess is formed in the opposite side of the cutter to receive a washer 13 that is mounted on the integral spindle 11 on the head and which prevents this side or face of the cutter from bearing directly against the head of the drill, said washer coöperating with the bushing 10 to form a substantially spool-shaped bearing for the cutter. In the form illustrated in Fig. 3 the cutter is rotatably mounted on a bushing 14 that is provided at its inner end with a flange 15 which fits in a recess formed in the inner face of the cutter, and a removable spindle 16 passes through said bushing and is screwed into the head of the drill, said spindle being provided in its outer end with an enlarged piece or cap 17 which laps over a washer 18 which is seated in a recess formed in the outer face or side of the cutter. Both of the constructions illustrated in Figs. 2 and 3 form efficient mountings for reversible cutters, as they provide large bearing surfaces for the cutters of substantially spool shape and permit the cutters to be reversed quickly. A lubricant holder D is mounted on the head of the drill in such a manner that it projects forwardly into the drill stem E to which the drill is connected, and lubricating ducts 19 are formed in the head so as to supply the lubricating medium to distributing ducts 20 formed in the spindles for the inclined side cutters.

Having thus described my invention, what I claim, and desire to secure by Letters Patent, is:

A rotary boring drill provided with a reversible inclined side cutter that acts on the bottom of the hole and also simultaneously removes the material from the side of the hole so as to maintain the clearance for the head, said cutter having a cylindrical body of substantially disk form that is provided on its periphery with transversely-disposed teeth that extend parallel to the axis of rotation of the cutter, the end portions of said teeth being oppositely beveled at the same angle, thereby producing a symmetrical cutter that can be reversed after the portion of same that maintains the clearance for the head has become worn.

In testimony whereof I hereunto affix my signature in the presence of two witnesses, this fourteenth day of November, 1914.

HOWARD R. HUGHES.

Witnesses:
C. E. REED,
S. EPSTEIN.